US012153219B2

(12) United States Patent
Yun et al.

(10) Patent No.: US 12,153,219 B2
(45) Date of Patent: Nov. 26, 2024

(54) OPTICAL SYSTEM

(71) Applicant: 3M INNOVATIVE PROPERTIES COMPANY, St. Paul, MN (US)

(72) Inventors: Zhisheng Yun, Sammamish, WA (US); Timothy L. Wong, West St. Paul, MN (US); Susan L. Kent, Shorewood, MN (US); Erin A. McDowell, Afton, MN (US); John D. Le, Woodbury, MN (US); Jo A. Etter, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 556 days.

(21) Appl. No.: 17/611,449

(22) PCT Filed: May 20, 2020

(86) PCT No.: PCT/IB2020/054796
§ 371 (c)(1),
(2) Date: Nov. 15, 2021

(87) PCT Pub. No.: WO2020/240354
PCT Pub. Date: Dec. 3, 2020

(65) Prior Publication Data
US 2022/0236568 A1 Jul. 28, 2022

Related U.S. Application Data

(60) Provisional application No. 62/852,423, filed on May 24, 2019.

(51) Int. Cl.
*G02B 27/01* (2006.01)
*G02B 3/00* (2006.01)
(Continued)

(52) U.S. Cl.
CPC ....... *G02B 27/0172* (2013.01); *G02B 3/0031* (2013.01); *G02B 5/0808* (2013.01);
(Continued)

(58) Field of Classification Search
CPC .... G02B 27/01; G02B 27/017; G02B 27/027; G02B 27/0101; G02B 27/0107;
(Continued)

(56) References Cited

U.S. PATENT DOCUMENTS 5,768,039 A   6/1998  Togino
6,480,338 B1  11/2002 Ohzawa
(Continued)

FOREIGN PATENT DOCUMENTS

WO    WO 2018-211405    11/2018

OTHER PUBLICATIONS

International Search Report for PCT International Application No. PCT/IB2020/054796, mailed on Aug. 11, 2020, 3 pages.

*Primary Examiner* — Sultan Chowdhury
(74) *Attorney, Agent, or Firm* — Jonathan L. Tolstedt

(57) ABSTRACT

Optical systems for displaying an image are described. The optical systems include a first and second optical lenses separated by air. A partial reflector is disposed on and conforms to a major surface of the first optical lens where the major surface can have a best-fit spherical radius of curvature in a range from 20 mm to 200 mm. A reflective polarizer is disposed on and conforms to a major surface of the first optical lens where the major surface can have a best-fit spherical radius of curvature greater than about 500 mm. A retarder layer is disposed between the reflective polarizer and the partial reflector. The first optical lens can have an optical birefringence of less than 15 nm/cm and the
(Continued)

second optical lens can have an optical birefringence of greater than 15 nm/cm. A method of fabricating an optical assembly is described.

10 Claims, 13 Drawing Sheets

(51) Int. Cl.
*G02B 5/08* (2006.01)
*G02B 5/26* (2006.01)
*G02B 5/30* (2006.01)

(52) U.S. Cl.
CPC .............. *G02B 5/26* (2013.01); *G02B 5/3083* (2013.01); *G02B 27/0176* (2013.01); *G02B 3/00* (2013.01); *G02B 2003/0093* (2013.01); *G02B 2027/0161* (2013.01)

(58) Field of Classification Search
CPC ............ G02B 27/0178; G02B 27/0172; G02B 27/283; G02B 5/22; G02B 5/26; G02B 5/265; G02B 5/28; G02B 5/3083; G02B 5/0808; G02B 3/00; G02B 3/0006; G02B 3/0062; G02B 3/10; G02B 2027/0107; G02B 2027/0112; G02B 2027/0114; G02B 2027/0161
See application file for complete search history.

(56) References Cited

U.S. PATENT DOCUMENTS

| | | | |
|---|---|---|---|
| 7,242,524 | B2 | 7/2007 | Dike |
| 9,557,568 | B1 | 1/2017 | Ouderkirk |
| 10,600,352 | B1* | 3/2020 | Wheelwright ....... G03H 1/0248 |
| 2002/0057498 | A1 | 5/2002 | Kobayashi |
| 2004/0014504 | A1 | 1/2004 | Coates |
| 2010/0254002 | A1 | 10/2010 | Merrill |
| 2012/0062846 | A1 | 3/2012 | Dike |
| 2015/0146166 | A1 | 5/2015 | Weber |
| 2020/0096780 | A1* | 3/2020 | Ouderkirk .......... G02B 17/0856 |
| 2020/0379226 | A1* | 12/2020 | Steiner ................. G02B 5/3083 |

* cited by examiner

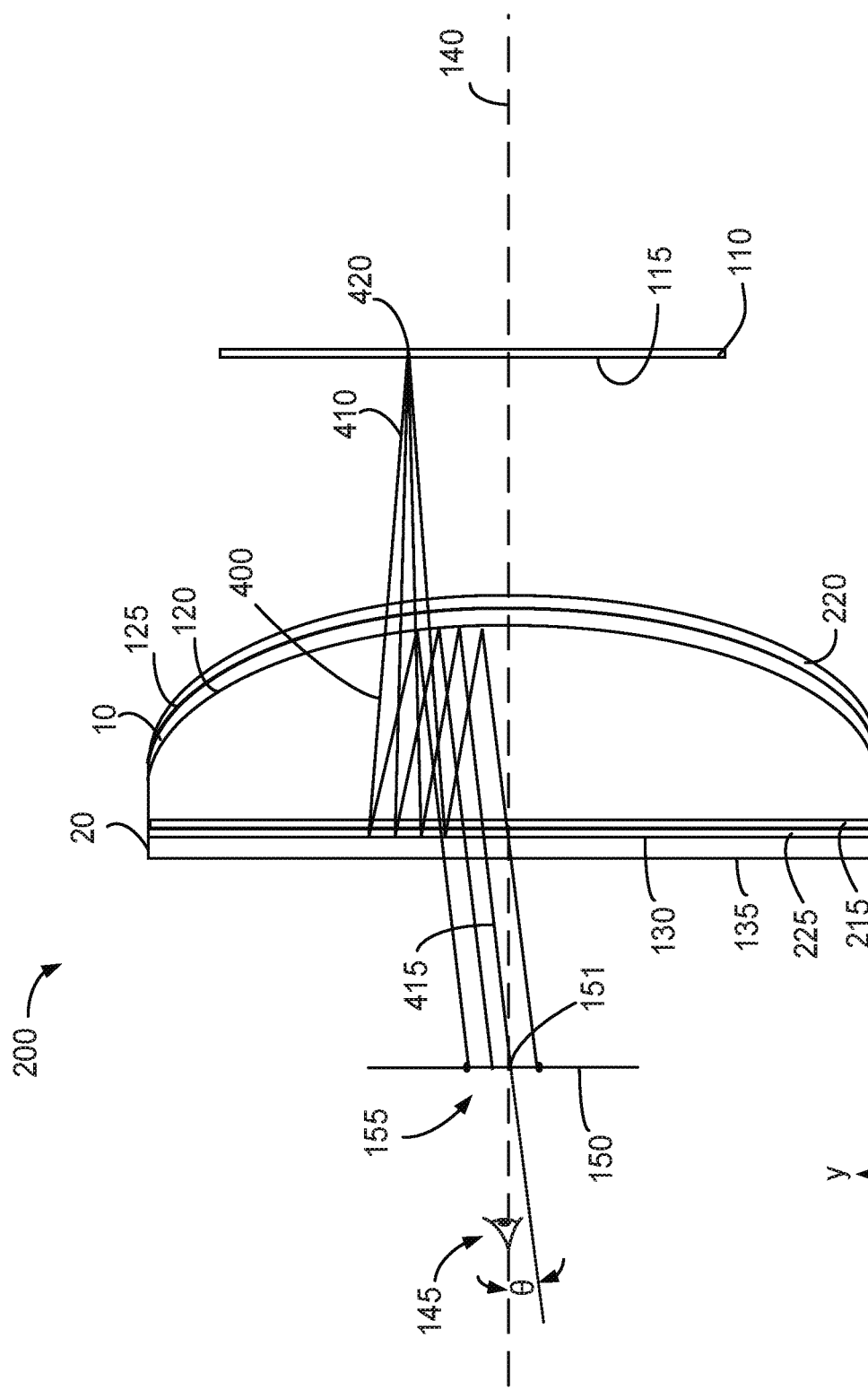

OPTICAL SYSTEM

CROSS REFERENCE TO RELATED APPLICATIONS

This application is a national stage filing under 35 U.S.C. 371 of PCT/IB2020/054796, filed May 20, 2020, which claims the benefit of Provisional Application No. 62/852,423, filed May 24, 2019, the disclosure of which is incorporated by reference in its/their entirety herein.

TECHNICAL FIELD

The disclosure generally relates to optical systems and particularly to folded optics.

BACKGROUND

Many displays, including virtual reality (VR) displays, attempt to present realistic images that replicate a real or imaginary environment. In some applications, VR displays attempt to provide immersive simulation of a three-dimensional environment.

SUMMARY

In some aspects of the present description, an optical system for displaying an image to a viewer is provided. The optical system includes a first and a second optical lenses, a partial reflector, a reflective polarizer and a first retarder layer. The first optical lens has an optical isotropy, a curved first and second major surfaces having a best-fit spherical first radius of curvature in a range from about 20 mm to about 200 mm. The curved first and second major surfaces are concave towards the second optical lens. The first optical lens has a thickness range from about 1 mm to 7 mm and the first optical lens is close to a display (imager). The second optical lens has an opposing third and fourth major surface having a best-fit spherical second radius of curvature greater than about 500 mm. In some embodiments, the second optical lens has an optical birefringence greater than about 15 nm/cm. In some embodiments, the second optical lens is substantially flat and has a thickness in the range of about 0.5 mm to 6 mm. The first optical lens is separated from the second optical lens by air. A partial reflector is disposed on and conforms to one of the curved first major surface or the curved second major surface of the first optical lens and has an average optical reflectance of at least 30% in a predetermined wavelength range not exceeding from about 400 nm to about 700 nm. A reflective polarizer is disposed on and conforms to one of the third major surface or the fourth major surface of the second optical lens. The reflective polarizer substantially reflects light having a first polarization state and substantially transmits light having an orthogonal second polarization state in the predetermined wavelength range. In some embodiments, the reflective polarizer is disposed between the second optical lens and the first optical lens, and the second optical lens has an optical birefringence. In some embodiments, the reflective polarizer is disposed between the second optical lens and the viewer, and the second optical lens has an optical isotropy. A first retarder layer is disposed between the display and the first optical lens and a second retarder layer disposed between the first and the second optical lenses.

In some aspects of the present description, an optical system for displaying an image as a virtual image to a viewer is provided. The optical system includes a hollow lens including curved first and second major surfaces and opposing flat third and fourth major surfaces. The curved major surfaces and the flat major surfaces are separated by air. A partial reflector curved substantially as the curved first and second major surfaces is disposed between the first major surface and the display and reflects at least 30% of visible light. A flat reflective polarizer is disposed between the curved second major surface and a viewer. The reflective polarizer substantially reflects normally incident visible light, reflecting at least 50% of the incident light having a first polarization state and transmitting at least 50% of the incident light having an orthogonal second polarization state. In some embodiments, the first retarder layer is disposed between the curved first major surface and the display and a second retarder is disposed between the curved second major surface and the flat reflective polarizer. In some embodiments, the first retarder layer is disposed on the curved first major surface and the second retarder layer is disposed on the third major surface. In some embodiments, the first retarder layer is substantially a quarter wave retarder for at least one visible wavelength. The optical system is substantially centered on an optical axis such that for an image emitted by the display having a spatial frequency of 11 line pairs per millimetre and a light ray from the image to the virtual image with a projection of the light ray on a plane formed by the optical axis and the second polarization state making an angle of about 0 degrees with the optical axis and a projection of the light ray on a plane formed by the optical axis and the first polarization state making an angle of about 25 degrees with the optical axis, the virtual image of the emitted image formed by the optical system has a modulation transfer function (MTF) greater than about 0.5.

In some aspects of the present description, a method of fabricating an optical assembly is provided. The method includes providing a first mold including a first curved mold surface having a best-fit spherical first radius of curvature in a range from about 20 mm to about 200 mm; providing a substantially flat reflective polarizer, each location on the reflective polarizer having a maximum reflectance greater than about 70% for a block polarization state and a maximum transmittance greater than about 70% for an orthogonal pass polarization state, a maximum variation of an orientation of the pass polarization state across the reflective polarizer being about θ1 degrees; placing the substantially flat reflective polarizer on the curved first mold surface and applying at least one of pressure and heat to at least partially conform the substantially flat reflective polarizer to the curved first mold surface; providing a second mold including a second mold surface spaced apart from and aligned with the first mold surface, the first and second mold surfaces defining a mold cavity therebetween; substantially filling the mold cavity with a flowable material having a temperature greater than a glass transition temperature of the reflective polarizer; and solidifying the flowable material to form a solid optical element bonded to the reflective polarizer, a maximum variation of an orientation of the pass polarization state across the bonded reflective polarizer being about θ2 degrees, θ1 and θ2 being within about 3 degrees of each other.

BRIEF DESCRIPTION OF THE DRAWINGS

FIG. 4C schematically illustrates an optical system in which a chief ray of the cone of light from an object passes through the center of the opening of the exit pupil and makes an angle of θ with the optical axis;

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Figure 1:
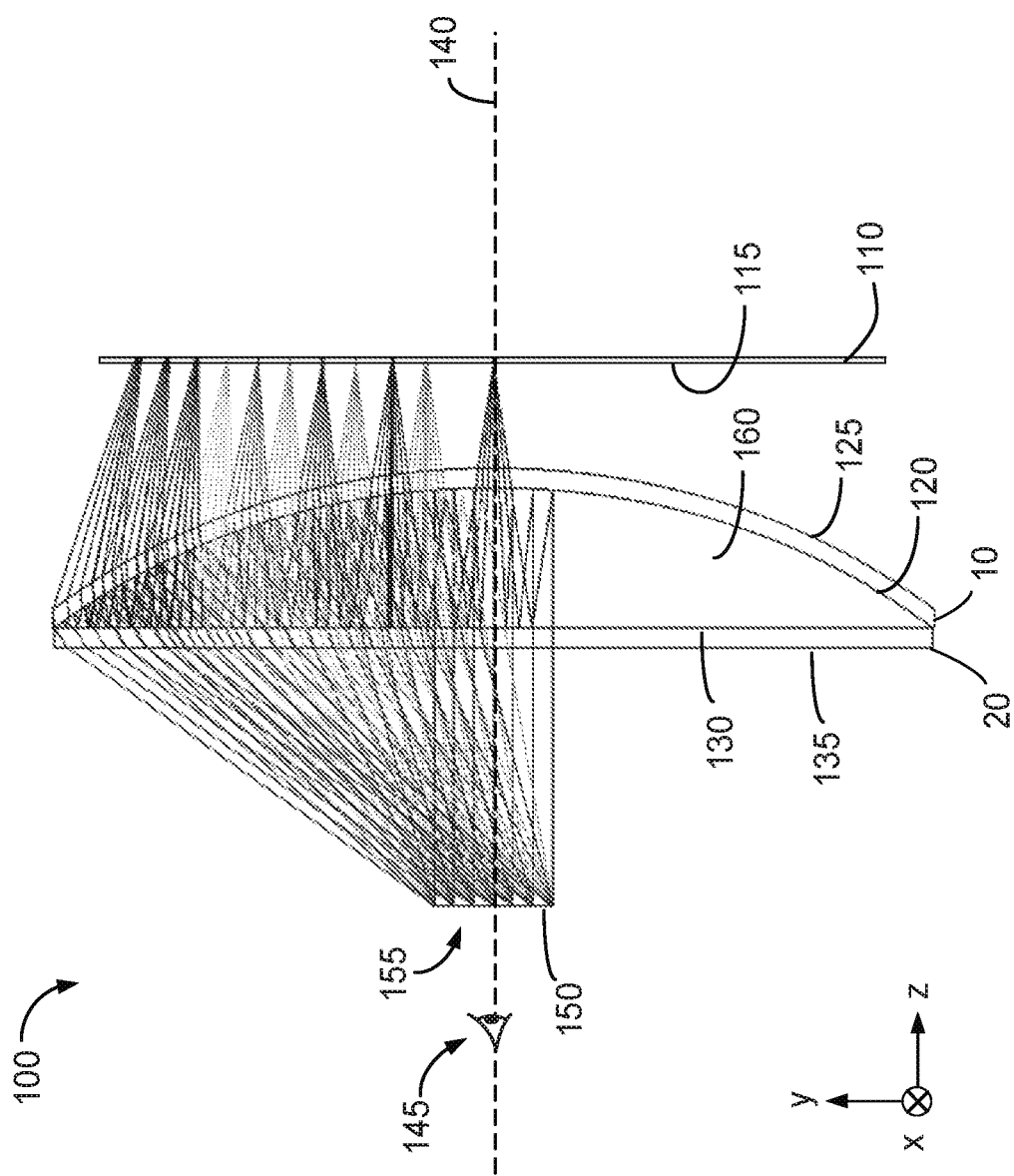
FIG. 1 is a diagram schematically illustrating an optical system.

FIG. 1 is a diagram illustrating optical system (100) in accordance with some embodiments of the present description. Optical system (100) may be described as a folded optical system in which a light beam is bent as it traverses the system so that the optical path of the light is longer than the length of the system. Optical systems disclosed herein employ folded optics and are useful for head-mounted displays, such as virtual reality displays, and cameras, such as cameras included in a cell phone, for example. The disclosed optical systems include a reflective polarizer, multiple lenses, and/or a retarder disposed between a stop surface (e.g., an exit pupil or an entrance pupil) and an image surface (e.g., a surface of a display panel or a surface of an image recorder). These systems can provide an optical system having a high field of view, a high contrast, a low chromatic aberration, a low distortion, and/or a high efficiency in a compact configuration that is useful in various applications. Folded optical systems are described, for example, in U.S. Pat. No. 9,557,568 (Ouderkirk et al.) which is hereby incorporated herein by reference to the extent that it does not contradict the present description.

It can be desirable for a compact optical system for virtual reality applications to have high resolution (small spot size), and a wide field of view (FOV). The wide field of view provides for an immersive experience for the viewer. The small spot size makes the images sharp and clear. When traversing through the optical system from the image to the exit pupil, the spot size increases due to various aberrations including spherical aberrations, comatic aberrations, astigmatism, etc. Aberrations of the lenses and the wave-like nature of light can cause light originating from one point of the image (see e.g., FIG. 1) to be distributed over the exit pupil opening apart from an ideal point's distribution. It is desired to reduce such aberrations to provide the desirable aspects of small spot size with a large field of view.

The modulation optical transfer function (MTF) is a measure of image quality characterizing the ability of an optical system to transfer contrast from an image to the exit pupil opening. The MTF is related to spot size by Fourier transformation from the spatial domain (spot size) to the frequency domain (MTF). The MTF (and spot size) of an optical system can be expressed as a function of spatial frequency. Spatial frequency quantifies the level of detail present in an image at the exit pupil opening and is often specified in units of line pairs per mm. High spatial frequency images have a larger amount of detail than images of lower spatial frequency. MTF can be determined for tangential and sagittal orientations at different wavelengths of light and at different angles of light with respect to the optical axis.

Some embodiments disclosed herein are directed to folded optical systems that have a specified (e.g., high) MTF at a predetermined spatial frequency. The systems disclosed herein include optical lenses with optical qualities that, when used in conjunction with a reflective polarizer and at least one retarder layer, provide for the MTFs that enhance the viewer experience of an immersive three-dimensional virtual environment.

FIG. 1 is a side view diagram of an optical system (100) in accordance with some embodiments. The optical system (100) is configured to display an image (115) to a viewer (145) through an opening (155). The optical system (100) includes a first optical lens (10) and a second optical lens (20) defining a cavity (160) therebetween, where the cavity can be filled with air or another material with a higher index than one. The first optical lens (10) is configured to receive the image (115) from an imager (110). In some configurations, the image (115) incident on the first optical lens (10) is elliptically polarized. In some configurations, the image (115) incident on the first optical lens (10) is circularly polarized.

The first optical lens (10) has a curved first major surface (125), and a curved second major surface (120). In some embodiments, the first optical lens (10) has a thickness in a range of about 1 mm to 7 mm. In some embodiments, the curved first major surface (125) and the curved second major surface (120) of the first optical lens (10) has a best-fit spherical first radius of curvature of at least about 20 mm, or at least about 25 mm, or at least about 30 mm. In some embodiments, the best-fit spherical first radius of curvature is no more than about 200 mm, or no more than about 150 mm, or no more than about 100 mm, or no more than 60 mm. For example, in some embodiments, the curved first major surface (125) and the curved second major surface (120) of the first optical lens (10) has a best-fit spherical first radius of curvature in a range from about 20 mm to about 150 mm or in a range of about 25 mm to about 100 mm or about 30 mm to about 60 mm. In some embodiments, the curved first major surface (125) and the curved second major surface (120) of the first optical lens (10) have aspherical surfaces. In some embodiments, the curved first major surface (125) is closer to the display (110). In some embodiments, the curved first major surface (125) has a refractive index of about 1.49 and includes one of a glass, a plastic or a polymethyl methacrylate (PMMA). In some embodiments, the curved second major surface (120) has a refractive index of about 1.49 to 1.8 and includes one of a glass, a plastic or a polymethyl methacrylate (PMMA).

The second optical lens (20) has a third major surface (130) and a fourth major surface (135). In some embodiments, the second optical lens (20) has a thickness in a range of about 0.5 mm to 6 mm. In some embodiments, third major surface (130) and a fourth major surface (135) of the second optical lens (20) has a best-fit spherical second radius of curvature greater than about 500 mm, or greater than about 750 mm, or greater than about 1000 mm. In some embodiments, the third major surface (130) and a fourth major surface (135) of the second optical lens (20) is flat or substantially flat. A surface of a lens in an optical system may be described as substantially flat if any curvature of the surface has a negligible effect on the optics of the optical system. In some embodiments, a substantially flat lens surface may have a best-fit spherical second radius of curvature greater than about 2 m or greater than about 5 m.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

The first optical lens (10) is separated from the opposing second optical lens (20) by air (160). In some embodiments, the lenses (10) and (20) define a hollow lens including curved first (125) and second (120) major surfaces, and opposing flat third (130) and fourth (135) major surfaces, where the curved major surfaces and the flat major surfaces are separated by air (160).

Figure 2:
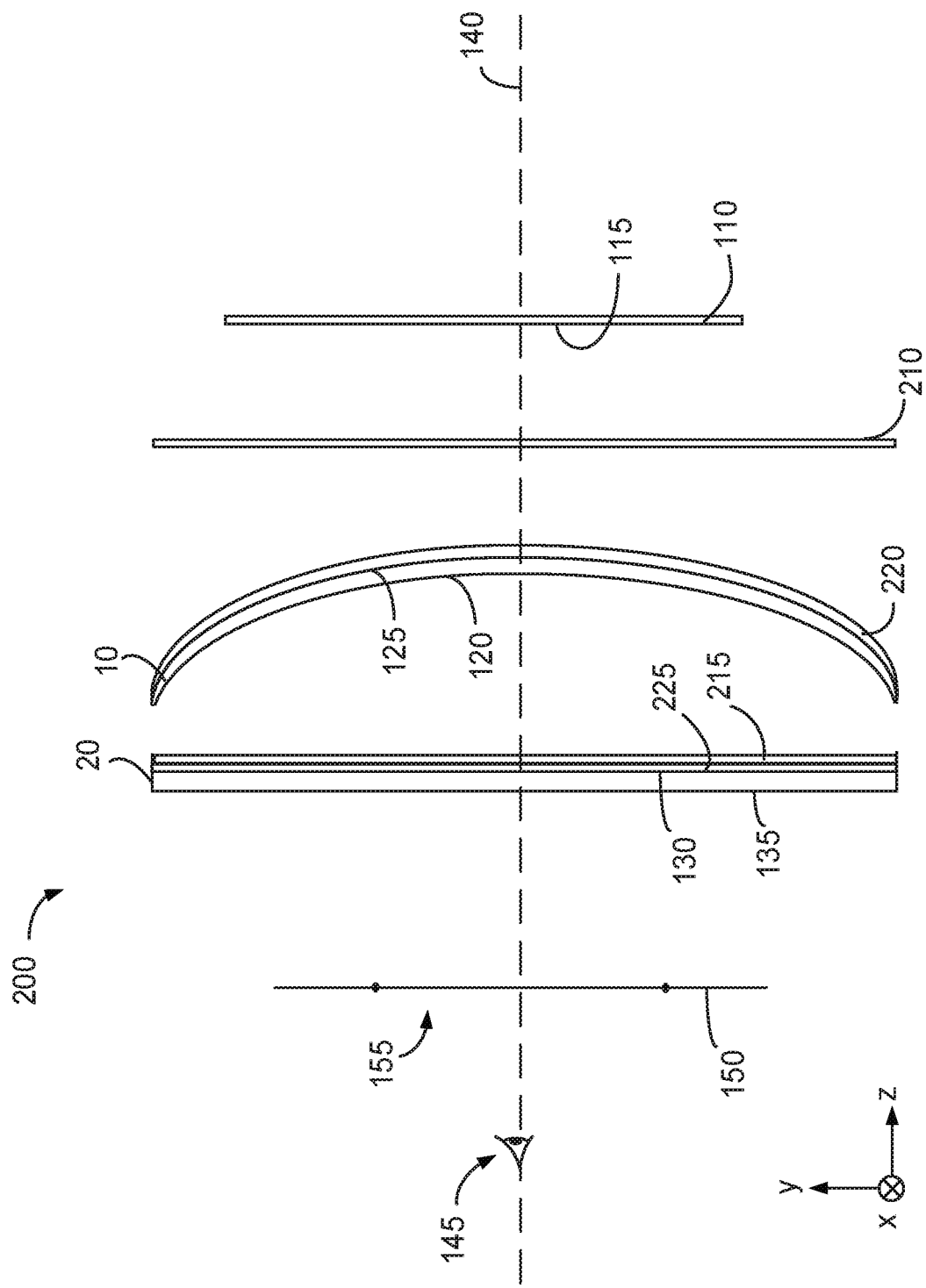
FIG. 2 is schematic cross-sectional view of an optical system.

FIG. 2 is a schematic cross-sectional view of an optical system (100) having the first optical lens (10) and the second optical lens (20). As shown in FIG. 2, the curved first major surface (125) and the curved second major surface (120) are concave towards the flat third major surface (130) and the flat fourth major surface (135). The first major surface (125) and the second major surface (120) has a best-fit spherical radius of curvature of R1. The best-fit spherical radius of curvature of a surface is the radius of a sphere that minimizes the squared distance along a normal to the sphere from the sphere to the surface. The best-fit spherical radius of curvature can be determined using conventional least squares fitting techniques. The first major surface (125) and the second major surface (120) have a radius of curvature at a vertex which may be the same as R1 (e.g., for a spherical lens), larger than R1, or smaller than R1.

As shown in FIG. 1, in some embodiments, the first major surface (125) and the second major surface (120) is concave toward the third major surface (130) and the fourth major surface (135). In some embodiments, one or both of the first and second optical lenses (10 and/or 20) has at least one aspherical surface. In some embodiments, an aspherical surface of an optical lens is described by Formula 1:

$$z = \frac{cr^2}{1 + [1 - (1+k)c^2r^2]^{1/2}} + Dr^2 + Er^4 + Fr^6 + Gr^8 + Hr^{10} + Ir^{12} + Jr^{14} + \ldots$$ (Formula 1)

where r is a distance from the optical axis of the optical system to the aspherical surface, z is a distance along the optical axis from a vertex of the aspherical surface to a point on the aspherical surface, c is a curvature coefficient, k is a conic constant, and D, E, F, G, H, I, J are correction coefficients of the aspherical surface. In some embodiments, higher order terms (e.g., a $Kr^{16}$ term and/or an $Lr^{18}$ term and/or an $Mr^{20}$ term) are included, and in some embodiments all higher order terms are negligible so that the aspherical surface shape can be described by Formula 1 with no terms of higher order than $r^{14}$. The quantity c+2D is the curvature at the vertex of the aspherical surface. In some embodiments, D is zero or about zero so that its contribution to the shape of the aspherical surface is negligible. In this case, c is the curvature at the vertex of the aspherical surface and the radius of curvature at the vertex is 1/c. The correction coefficients may be specified without expressly reciting units with the understanding that z and r are expressed in mm. A correction coefficient may be described as being about zero if it is sufficiently small that the difference in the shape of the surface with the correction coefficient included and with it omitted is sufficiently small that it negligibly affects the optical performance of the optical system.

In some embodiments, first major surface (125) and the second major surface (120) of the first optical lens (10) have aspherical surface. In some embodiments, this aspherical surface is described by Formula 1. In some embodiments, the conic constant k is in a range from about 3 to 7 (e.g., about 4.6). In some embodiments, a radius of curvature of the vertex of the aspherical surface is in a range from about 40 mm to 50 mm. In some embodiments, k is about 4.6, c is about 1/44.9 mm$^{-1}$, D is about zero, E is about −1.3E-06 (which may also written as −1.3×10$^{-6}$), F is about 6E-09, and G is about −1.6E-12. In some embodiments, H, I and J and higher order terms are zero or are about zero.

As shown in FIG. 2, a partial reflector (220) is disposed on and conforms to the curved first major surface (125) of the first optical lens (10). In some embodiments, the partial reflector (220) may also be disposed on and conforming to the curved second major surface (120) of the first optical lens (10). In some embodiments, the partial reflector (220) is curved substantially as the curved first and second major surfaces (125 and 120). In some embodiments, the partial reflector (220) has an average optical reflectance of at least 30% in a predetermined wavelength range. The wavelength range can extend from about 400 nm to about 700 nm.

The partial reflector (220) used in the optical systems (100) of the present description may be any suitable partial reflector. For example, the partial reflector (220) may be constructed by coating a thin layer of a metal (e.g., silver or aluminum) on a transparent substrate (e.g., a film which may then be adhered to a lens, or the substrate may be a lens). The partial reflector (220) may also be formed by depositing thin-film dielectric coatings onto a surface of a lens substrate, or by depositing a combination of metallic and dielectric coatings on the surface, for example. In some embodiments, the partial reflector (220) has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector (220) may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refers to the unweighted average over polarizations of the optical reflectance and optical transmittance, respectively, determined at normal incidence unless indicated otherwise. In some embodiments, the partial reflector (220) may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

The optical system (100) includes a reflective polarizer (225) disposed and conformed to one of the third major surface (130) and the fourth major surface (135) of the second optical lens (20). In the illustrated embodiment, the reflective polarizer (225) is disposed on and conforms to the third major surface (130) of the second optical lens (20). In other embodiments, the reflective polarizer (225) may be disposed on the fourth major surface (135) of the second optical lens (20). In some embodiments, the reflective polarizer (225) substantially reflects light having a first polarization states (e.g., a first polarization state with the electric field along the x-axis) and substantially transmits light having an orthogonal second polarization states (e.g., a second polarization state with the electric field along the y-axis) in the predetermined wavelength range. A reflective polarizer may be said to substantially transmit light having a first polarization state in a predetermined wavelength range if at least 60 percent of light having the first polarization state in the predetermined wavelength range is transmitted through the polarizer. In some embodiments, at least 70 percent, or at least 80 percent, of light having the first polarization state in the predetermined wavelength range is transmitted through the polarizer. A reflective polarizer (225) may be said to substantially reflect light having a second polarization state in a predetermined wavelength range if at least 60 percent of light having the second polarization state in the predetermined wavelength is reflected from the reflective polarizer. In some embodiments, at least 70 percent, or at least 80 percent, of light having the second polarization state and the predetermined wavelength is reflected from the reflective polarizer (225).

The reflective polarizer (225) used in the optical systems (100) of the present description may be any suitable type of reflective polarizer. The reflective polarizer (225) may be a polymeric multilayer optical film that may be substantially uniaxially oriented as described further elsewhere herein. Substantially uniaxially oriented reflective polarizers are available from 3M Company under the trade designation Advanced Polarizing Film or APF. Other types of multilayer optical film reflective polarizers (e.g., Dual Brightness Enhancement Film or DBEF available from 3M Company) may also be used. In some embodiments, other types of reflective polarizers (e.g., wire-grid polarizers) are used.

As illustrated in FIG. 2, the optical system (100) includes a first retarder layer (210) disposed between the display (110) and the first optical lens (10) and a second retarder layer (215) disposed between the first optical lens (10) and the second optical lens (20). More specifically, the second retarder layer (215) is disposed between the first optical lens (10) and the reflective polarizer (225). In some embodiments, the first retarder layer (210) is disposed on and conforms to the curved first major surface (125). In some embodiments, the second retarder layer (215) is disposed on and conforms to the third major surface (130). The first retarder layer (210) can be substantially a quarter wave retarder for at least one wavelength in the predetermined wavelength range (e.g., for at least one visible wavelength) in some embodiments. In some case, the predetermined wavelength range is the visible wavelength range from about 420 nm to about 700 nm. Some configurations of the optical system (100) include a second retarder layer (215), where the first optical lens (10) is disposed between the second optical lens (20) and the second retarder layer (215). Optionally, the optical system (100) includes a first linear absorbing polarizer (not shown in figure). For example, the second retarder layer (215) may be disposed between the first optical lens (10) and the first linear absorbing polarizer. Optionally, the optical system (100) includes a second linear absorbing polarizer (not shown), where the second optical lens (20) is disposed between the second linear absorbing polarizer and the reflective polarizer (225).

In some configurations, the predetermined wavelength range may include a wavelength of about 550 nm, e.g., may include the wavelength 587.6 nm. The predetermined wavelength range may extend from about 400 nm to about 700 nm in some embodiments. For example, the predetermined wavelength range can include a blue primary color wavelength, a green primary color wavelength, and a red primary color wavelength. The predetermined wavelength range may be any wavelength range over which the optical system is designed to operate. In some embodiments, the predetermined wavelength ranges include other wavelength ranges. For example, infrared (e.g., near infrared (about 700 nm to about 2500 nm)) and/or ultraviolet (e.g., near ultraviolet (about 300 nm to about 400 nm)) wavelengths as well as visible (400 nm to 700 nm) wavelengths may be included in the predetermined wavelength range.

The optical system (100) has an optical axis (140). The optical system (100) is configured such that a light ray propagating along the optical axis (140) passes through the first and second optical lenses (10 and 20), the partial reflector (220), the reflective polarizer (225), and the first retarder layer (210) without being substantially refracted. In some configurations, at least one of the first and second optical lenses (10 and 20), the partial reflector (220), the reflective polarizer (225), and the first retarder layer (210) is rotationally symmetric. In some configurations, at least one of the first and second optical lenses (10 and 20), the partial reflector (220), the reflective polarizer (225), and the first retarder layer (210) is non-rotationally symmetric. In some configurations, at least one of the first and second optical lenses (10 and 20), the partial reflector (220), the reflective polarizer (225), and the first retarder layer (210) has at least one plane of symmetry.

The optical axis (140) of an optical system (100) or a display system or an optical lens or optical element in an optical system (100) can be understood as an axis near the center of the system or a lens or optical element where a light ray propagating along the optical axis passes through the lenses and/or optical element(s) with a low or minimum degree of refraction so that light propagating along axes different from the optical axis experience greater degrees of refraction. In some embodiments, each of the lenses is centered on an optical axis through an apex of each of the lenses. The light ray along the optical axis may pass through the lenses and/or optical element(s) without being refracted or without being substantially refracted. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. In some embodiments, the optical axis of an optical system is an axis such that a light ray propagating along the axis passes through the optical lenses, the partial reflector, the reflective polarizer and the retarder layer(s) without being substantially refracted. In some embodiments, a light ray propagating along the axis passes through the optical lenses, the partial reflector, the reflective polarizer and the retarder layer(s) without being refracted by more than 10 degrees, or more than 5 degrees, or more than 3 degrees, or more than 2 degrees at any major surface of the optical system.

The first and second optical lenses (10 and 20), of the optical system (100) may be made of any suitable material such as glass or plastic. The first optical lens (10) may include one or more of a borosilicate BK7 glass, a lanthanum crown LAK34, a lanthanum flint LAF7 glass, a flint F2 glass, a dense flint SF2, a lanthanum dense flint LASF45, and a fluorophosphate FPL51 and a fluorophosphate FPL55 glass. The second optical lens (20) may be made of plastic and may include one or more of polymethylmethacrylate (PMMA), a polystyrene, a polyvinyl alcohol, and a polycarbonate. In some embodiments, the first optical lens (10) is a monolithic glass element. In some embodiments, the second optical lens (20) is a monolithic plastic element.

In some embodiments, the first optical lens (10) is made from a glass having a low birefringence and the second optical lens (20) is made from a plastic which may have birefringence greater than that of the first optical lens (10). In some embodiments, the first optical lens (10) has a birefringence less than about 20 nm/cm, or less than about 15 nm/cm, or less than about 10 nm/cm, or less than about 7 nm/cm. In some embodiments, the second optical lens (20) has a birefringence greater than about 10 nm/cm, or greater than about 15 nm/cm, or greater than about 20 nm/cm. In some embodiments, the first optical lens (10) has a birefringence less than that of the second optical lens (20). In some embodiments, the first optical lens (10) has an optical isotropy (e.g., the first optical lens (10) may be substantially optically isotropic such that the lens is free of birefringence or any birefringence that may be present is less than about 10 nm/cm or less than about 7 nm/cm). In some embodiments, the reflective polarizer (225) is disposed between the second optical lens (20) and the first optical lens (10), i.e., when the reflective polarizer (225) is closer to the display (110), and the second optical lens (20) has an optical birefringence. In some embodiments, the reflective polarizer (225) is disposed between the second optical lens (20) and the viewer (145), i.e., when the reflective polarizer (225) is closer to the viewer (145), and the second optical lens (20) has an optical isotropy.

In some embodiments, the index of refraction of the material of the first optical lens (10) is about 1.44, or about 1.50 or about 1.52 at wavelengths of about 550 nm, e.g., 587.6 nm. In some embodiments, the second optical lens (20) has an index of refraction of about 1.49 or about 1.62 at about 550 nm, e.g., 587.6 nm.

As shown in FIG. 1, the imager (110) can be disposed adjacent to and facing the first optical lens (10). The imager (110) emits the image (115) which is incident on the first optical lens (10). The exit pupil (150) is disposed adjacent and facing the second optical lens (20) and defines an opening (155) therein. The image (115) incident on the first optical lens (10) exits the optical system (100) through the opening (155) in the exit pupil (150). The image (115) incident on the first optical lens (10) may be elliptically polarized. The exiting image at the opening (155) may be substantially linearly polarized.

Figure 3A:
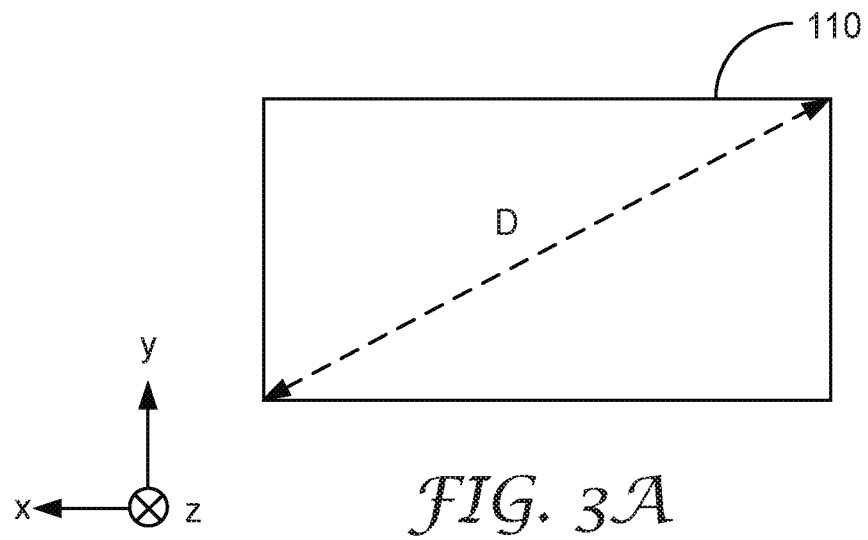
FIG. 3A schematically shows an imager.
Figure 3B:
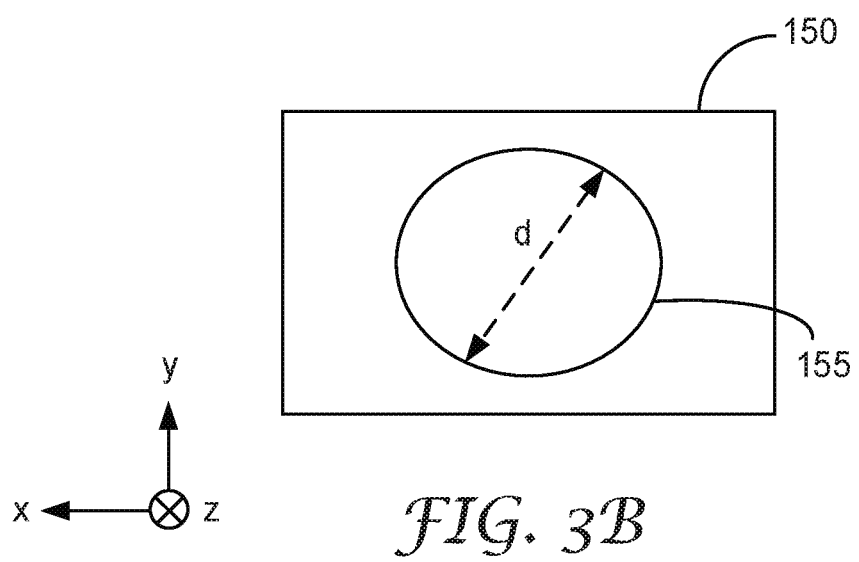
FIG. 3B schematically shows the opening of the exit pupil of an optical system.

As shown in FIG. 3A, the imager (110) can be substantially a polygon. FIG. 3B shows the opening (155) of the exit pupil (150) which can be substantially circular. As shown in FIGS. 3A and 3B, a maximum lateral dimension of an active region of the imager is D (see FIG. 3A) and a maximum lateral dimension of the opening of the exit pupil is d (see FIG. 3B). In some embodiments the ratio D/d is between about 1 and about 20, e.g., 1≤D/d≤20. In some embodiments, the ratio of D/d is between about 2 and about 15, e.g., 2≤D/d≤15. In some embodiments the ratio of D/d is between about 5 and about 10, e.g., 5≤D/d≤10.

In some embodiments, the exit pupil (150) is a physical aperture defining the opening (155). In other embodiments, the exit pupil (150) is a virtual aperture. For example, the exit pupil (150) may be an image of an aperture stop of the optical system (100). In embodiments where the exit pupil (150) is a virtual aperture, the opening (155) in the exit pupil (150) refers to the interior region of the virtual aperture. The exit pupil (150) and/or the opening (155) may be rectangular, square, elliptical, circular, or may have some other shape. In some embodiments, the optical system (100) is a component of a head-mounted display configured such that when worn by a viewer (145), the exit pupil opening (155) overlaps the pupil of an eye of the viewer (145).

The maximum lateral dimension of the opening (155) of the exit pupil (150) can be in a range from about 2 mm to about 10 mm or in a range from about 2 mm to about 80 mm, for example. A separation between the exit pupil (150) and the second optical lens (20) can be in a range from about 5 mm to about 30 mm or in a range from about 10 mm to about 20 mm, for example.

Figure 4A:
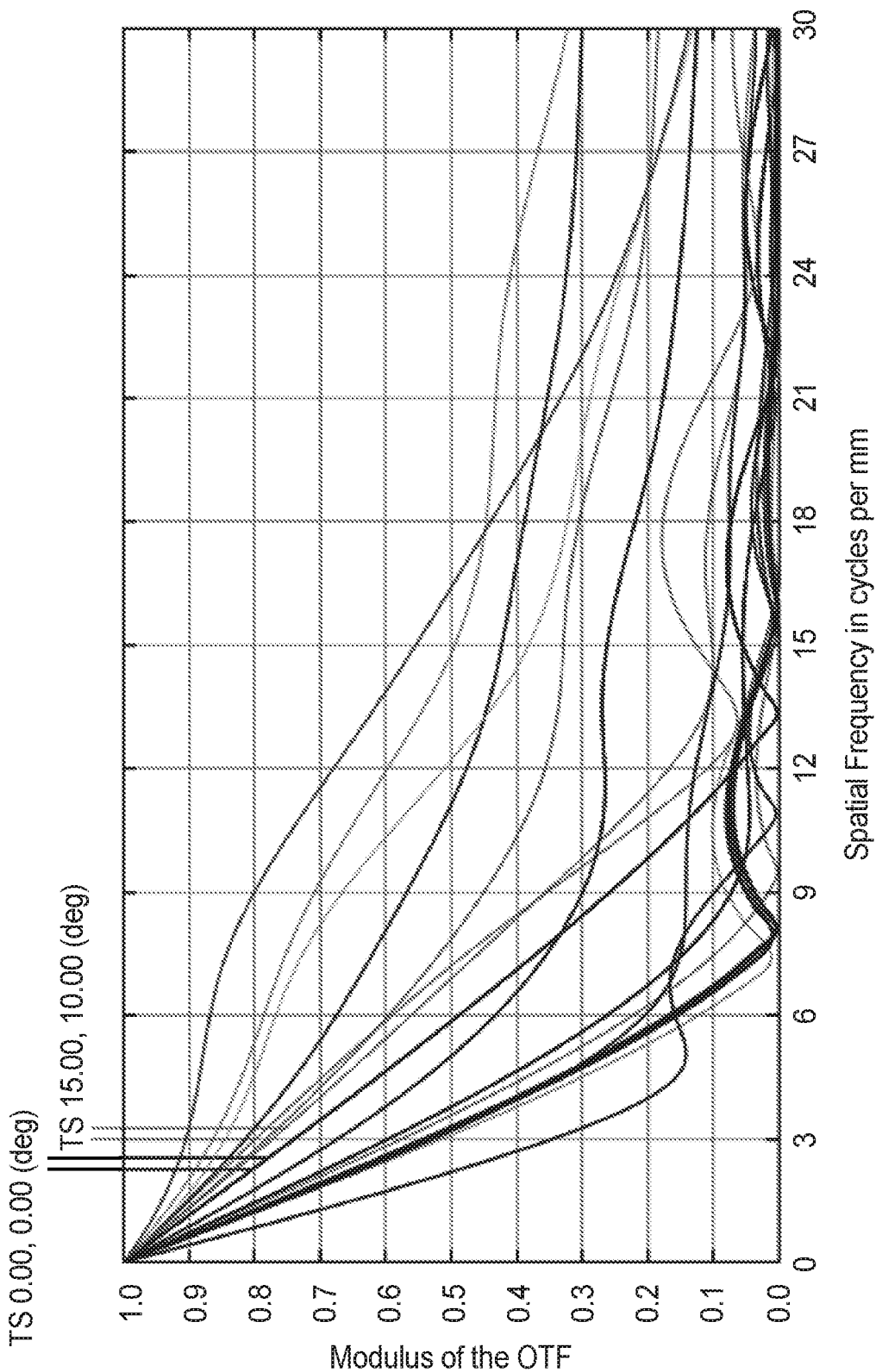
FIGS. 4A-4B show families of curves representing the modulation transfer function (Modulus of optical transfer function (OTF)) plotted as a function of the spatial frequency in cycles per millimeter (also referred to as line pairs per millimeter) for optical systems in accordance with some embodiments.
Figure 4B:
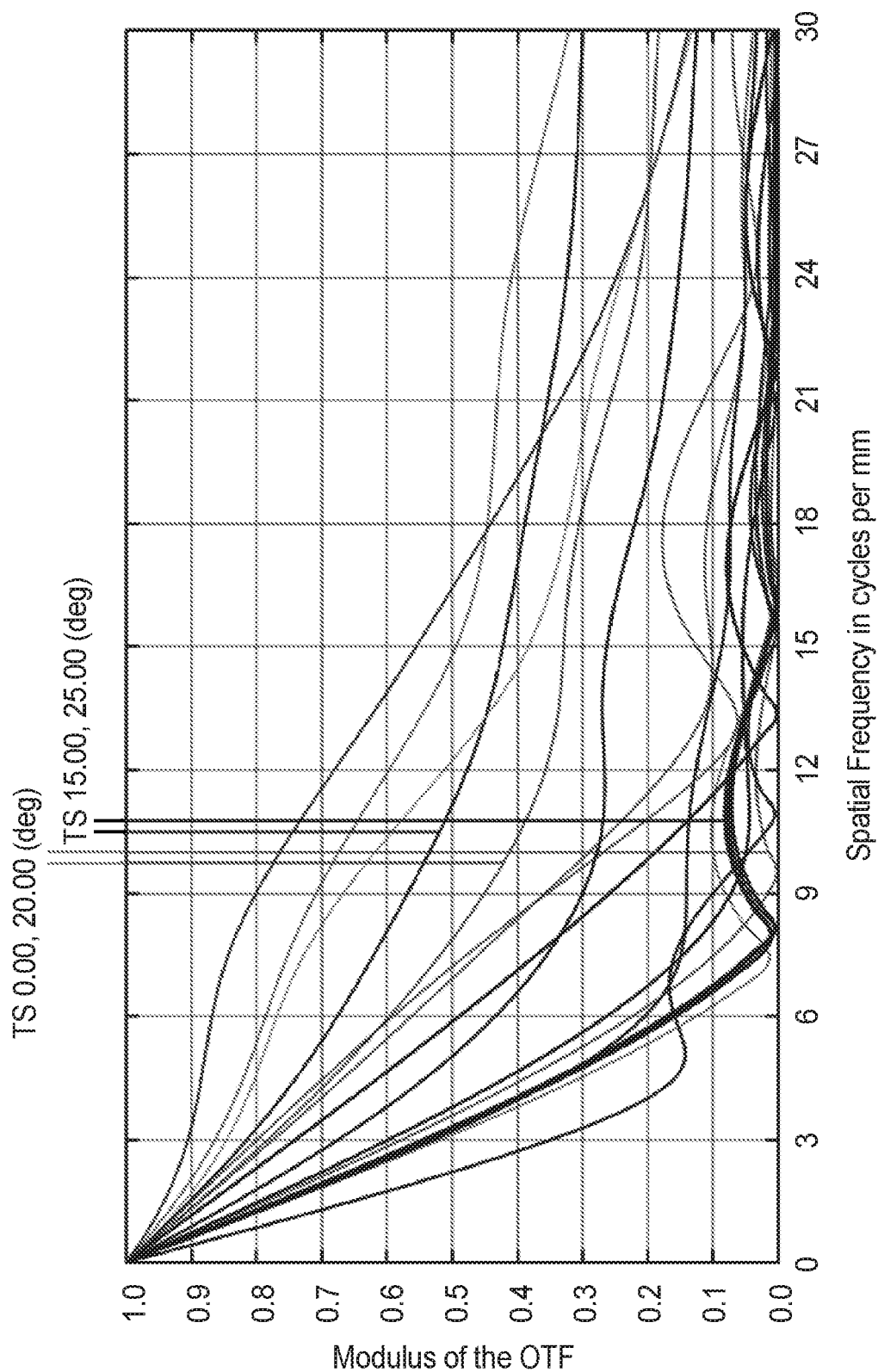

According to some embodiments, an optical system (100) provides a specified modulation transfer function. FIGS. 4A-4B show families of curves representing the modulation transfer function (Modulus of optical transfer function (OTF)) plotted along the y axis as a function of the spatial frequency in cycles per millimeter (also referred to as line pairs per millimeter) along the x-axis. The family of curves provides the MTF vs. spatial frequency for the optical system (100) for various angles of light at the exit pupil opening (155) with respect to the optical axis (140) of the optical system (100) for three embodiments of the optical system (100) determined by optical modeling. In the embodiment of FIG. 4A, the focal length was 18.2 mm, the field of view was 70 degrees, the image height was 12.7 mm, the f-number was 1.8, the eye relief was 17 mm and the eye box was 10 mm. In the embodiment of FIG. 4B, the focal length was 18.2 mm, the field of view was 90 degrees, the image height was 18.1 mm, the f-number was 1.8, the eye relief was 17 mm and the eye box was 10 mm. In each of the embodiments of FIG. 4A-4B, the second lens (20) was modeled as an acrylic lens. In the embodiments of FIGS. 4A and 4B, the first lens (10) was modeled as a borosilicate BK7 glass. In FIG. 4A, the MTF vs. spatial frequency curves are plotted for 0, 0, 15, and 10 degree angles of light at the exit pupil opening (155) for both tangential (T) and sagittal (S) orientations. In FIG. 4B, the MTF vs. spatial frequency curves are plotted for 0, 20, 0, and 25 degree angles of light at the exit pupil opening (155) for both tangential (T) and sagittal (S) orientations.

In some aspects of the present description, methods of fabricating optical assemblies are provided. In some embodiments, the resulting optical assemblies have improved properties compared to other optical assemblies made using conventional techniques, as described further elsewhere herein. In some embodiments, the optical assembly is formed by insert molding a lens onto an optical film without pre-forming the optical film before the molding process. This has been found to reduce or eliminate defects such as buckling or tearing of the optical film. The optical assembly may include an optical lens (e.g. second optical lens (20) and a reflective polarizer (225) disposed on and conforming to a major surface of the optical lens.

Figure 4D:
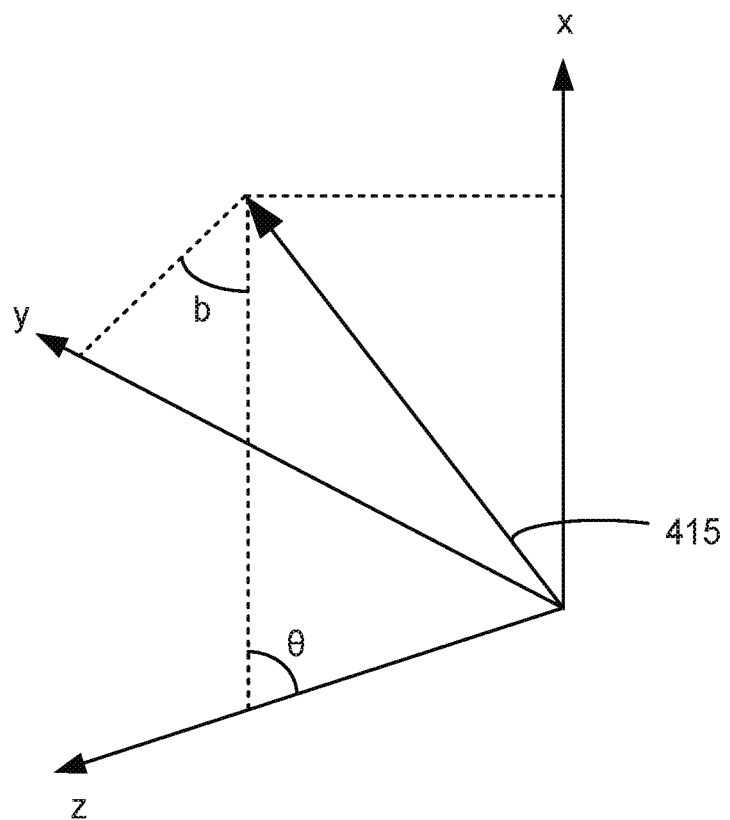
FIG. 4D schematically illustrates projection of the chief ray on a plane formed by the optical axis and a first polarization state and a plane formed by the optical axis an orthogonal polarization state.

As shown in FIG. 4C, a cone of light (410) is incident on the optical system (200) from an object (420) and fills the exit pupil opening (155). A chief ray (415) of the cone of light (410) passes through a center (151) of the opening (155) of the exit pupil (150) and the chief ray (415) makes an angle θ with the optical axis (140) (in some embodiments, the projection of the chief ray makes an angle θ with the optical axis (140)). A marginal ray (400) of the cone of light (410) passes though the exit pupil (150) at an edge of the opening (155). FIG. 4D schematically illustrates projection of the chief ray (415) on a plane formed by the optical axis (z) and a first polarization state (x) and a plane formed by the optical axis (z) an orthogonal polarization state (y). The cone of light (410) may include a spatial frequency of about 11 line pairs per millimeter and the modulation transfer function (MTF) of the optical system (200) may be greater than about 0.5 or greater than about 0.55, or even greater than about 0.575 when the angle "0" is about 0 degrees and angle "b" is about 25 degrees. In some embodiments, the cone of light (410) include a spatial frequency of about 3 line pairs per millimeter, or about 4 line pairs per millimeter, or about 5 line pairs per millimeter, and the modulation transfer function (MTF) of the optical system (200) is greater than about 0.7, or greater than about 0.75, or greater than about 0.8 or greater than about 0.825 when the angle "θ" is about 15 degrees and the angle "b" is about 10 degrees. For example, in the embodiments of FIG. 4A, both the tangential and sagittal MTFs are about 0.7 or greater for each angles "a" and "b" shown in the plots at about 3 line pairs per millimeter, and in the embodiment of FIG. 4B, the tangential MTF is about 0.5 or greater for angle "θ" and shown in the plots at about 11 line pairs per millimeter, and the sagittal MTF are about 0.05 or greater for each of the angle "b" shown in the plots at about 11 line pairs per millimeter.

In some embodiments, for at least one larger θ and at least one smaller θ, each greater than about 5 degrees, the optical system (200) has a smaller modulation transfer function (MTF) for the larger θ and a larger MTF for the smaller θ at a spatial frequency of about 30 line pairs per millimeter. It is the corresponding MTF (e.g., tangential or sagittal or average of the two) that is to be compared at the larger and smaller θ. For example, the sagittal MTF for θ of 25 degrees is smaller than the sagittal MTF for θ of 10 degrees at a spatial frequency of about 20 line pairs per millimeter in the embodiment of FIG. 4A. In the embodiment of FIG. 4B, the tangential MTF for θ of 45 degrees is smaller than the tangential MTF for θ of 40 degrees at a spatial frequency of about 20 line pairs per millimeter. In the embodiment of FIG. 4C, the sagittal MTF for θ of 50 degrees is smaller than the sagittal MTFs for θ of 45 or 25 degrees at a spatial frequency of about 20 line pairs per millimeter.

Various cones of light emitted by imager (110) are shown in FIG. 1, for example. In the illustrated embodiment, each chief ray of the cones of light passes through a center of the exit pupil opening (155) and makes an angle with the optical axis (140) which is 0 degrees for the chief ray emitted along the optical axis (140) and increase with distance in the y-direction from the optical axis (140). In some embodiments, the angle with the optical axis (140) is at least about 35 or at least about 45 degrees for a chief ray emitted from an edge of the imager (110).

Figure 5A:
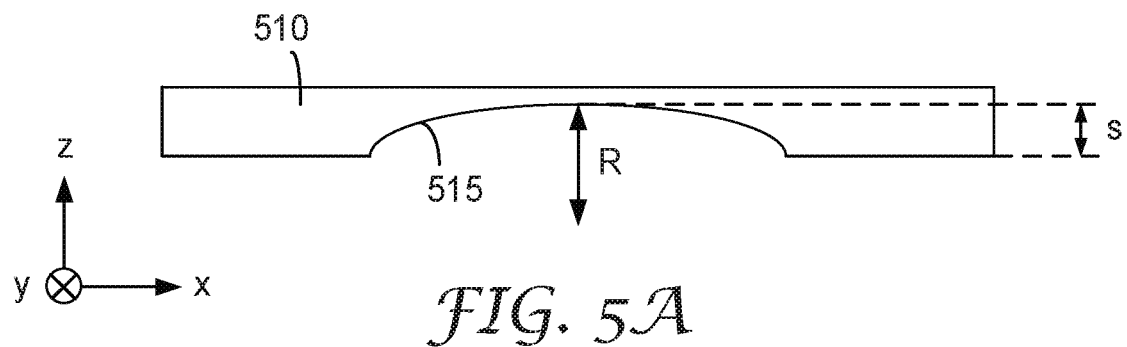
FIGS. 5A-5D schematically illustrate a method for fabricating an optical assembly.
Figure 5B:
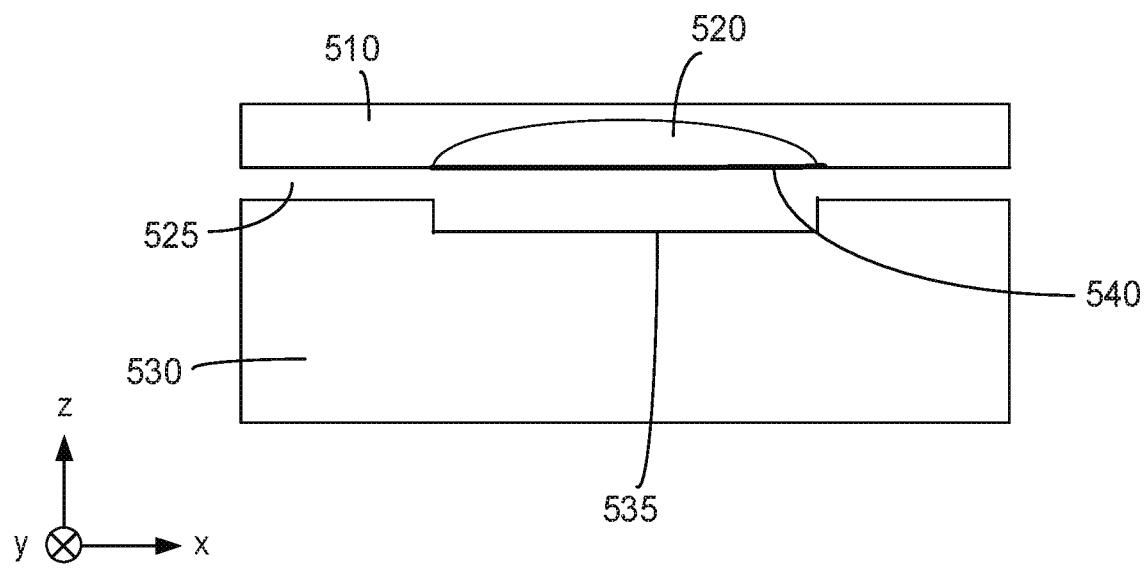
Figure 5C:
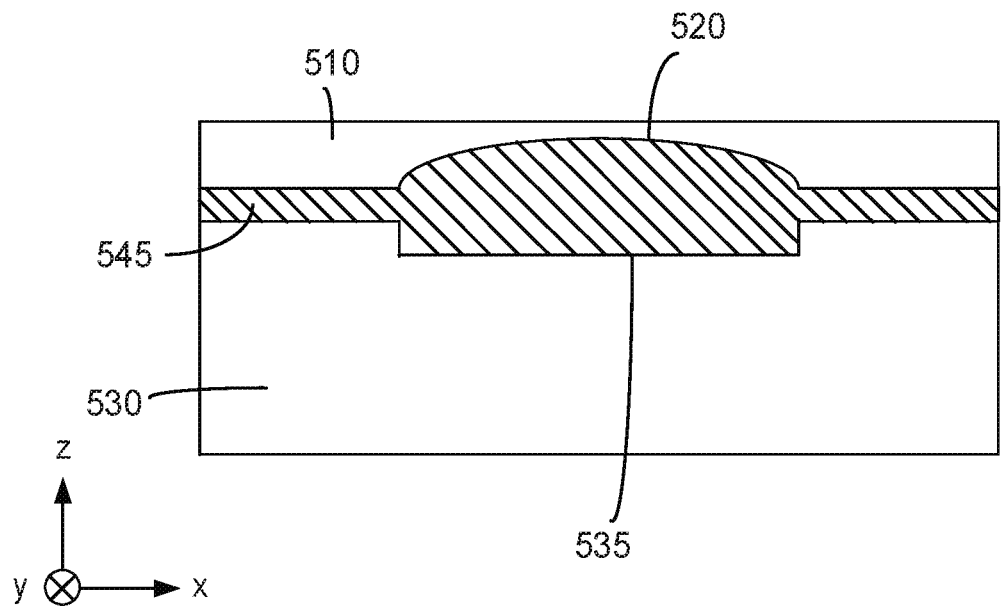
Figure 5D:
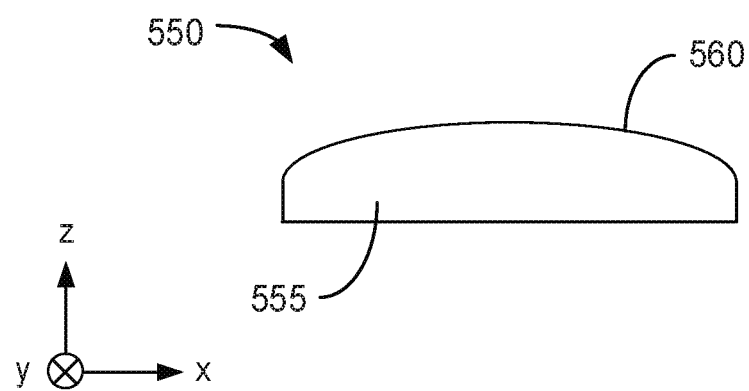

FIGS. 5A-5D schematically illustrate a method of fabricating an optical assembly. The method includes: providing a first mold (510) having a first curved mold surface (515) (FIG. 5A); placing a substantially flat optical film (540) on the first curved mold surface (515) and applying at least one of pressure and heat to at least partially conform the optical film (540) to the first curved mold surface (515) (FIGS. 5B-5C); providing a second mold (530) including a second mold surface (535) spaced apart from and aligned with the first mold surface (515), the first and second mold surfaces (515) and (535) defining a mold cavity (520) therebetween (FIG. 5B); substantially filling the mold cavity (520) with a flowable material (545) (FIG. 5C); and solidifying the flowable material to form a solid optical element (555) bonded to the optical film (560) (FIG. 5D).

The solid optical element bonded to the optical film may be referred to as an optical assembly and may correspond to the lens (20) bonded to the reflective polarizer (225), for example. The first and second molds (510) and (530) may be removed and any excess material (e.g., runner material from gate (525)) removed to provide the optical assembly depicted in FIG. 5D. Substantially filling the mold cavity can be understood to mean filling the mold cavity to greater than 50 percent by volume. In some embodiments, the mold cavity is filled to at least 80 percent by volume, or to at least 90 percent by volume, or to at least 95 percent by volume. In some embodiments, the mold cavity (520) is completely filled with flowable material (545) except for the volume occupied by the optical film (540).

In some embodiments, the optical film (540) is conformed to the first curved mold surface (515) by using the flowable material (545) to push the optical film (540) onto the first curved mold surface (515). In some embodiments, the flowable material (545) has a temperature greater than a glass transition temperature of the optical film (540) when the flowable material (545) flows into the cavity (520). In some embodiments, the first and second molds (510) and (530) are held at a temperature below a melting point of the flowable material (545) in order to solidify the flowable material (545). In some embodiments, the temperature of the first and second molds (510) and (530) are also below the glass transition temperature of the optical film (540) when the flowable material (545) flows into the cavity (520). For example, the flowable material (545) may have a temperature in a range of 250 to 300° C. when it is introduced into the cavity (520), the first and second molds may have a temperature in a range of 75 to 100° C., and the optical film (540) may have a glass transition temperature in a range of 105 to 130° C. In some embodiments, the optical film (540) has multiple layers and the flowable material (545) has a temperature greater than a glass transition temperature of each layer of the optical film (540) when the flowable material (545) flows into the cavity (520). In some embodiments, the optical film (540) has multiple layers and the flowable material (545) has a temperature greater than a glass transition temperature of at least one layer of the optical film (540) when the flowable material (545) flows into the cavity (520). In some embodiments, the optical film (540) has multiple layers and the flowable material (545) has a temperature greater than a glass transition temperature of the layer of the optical film (540) immediately adjacent the flowable material (545) when the flowable material (545) flows into the cavity (520) and contacts the optical film (540).

The steps depicted in FIGS. 5A-5D can be carried out in other orders. For example, the optical film (540) can be conformed to the first curved mold surface (515) prior to introducing the flowable material (545) using air pressure, for example. Then the second mold (530) can then be provided and the flowable material (545) then introduced into the mold cavity (520).

In some embodiments, the first mold (510) is a first mold insert which is configured to be placed in a mold base. Similarly, in some embodiments, second mold (530) is a second mold insert which is configured to be placed in a mold base.

In some embodiments, the solid optical element (555) is permanently bonded to the optical film (540). In other embodiments, the solid optical element (555) is releasably bonded to the optical film (540). For example, a release coating may be applied to the optical film (540) prior to placing the optical film on the first mold surface (515). This can be done to allow the optical film (540) to be removed from the solid optical element (555) and placed on a surface of another optical element having a similar shape, for example.

The first curved mold surface (515) has a best-fit spherical first radius of curvature R which, in some embodiments, is in a range from about 20 mm or about 30 mm to about 1000 mm or about 200 mm (e.g., in a range from about 20 mm to about 200 mm). The first curved mold surface (515) has a sag S. In some embodiments, a ratio of the sag S to the best-fit spherical first radius of curvature R is in a range of about 0.02 to about 0.2, or in a range of about 0.02 to about 0.15, or in a range of about 0.02 to about 0.12, or in a range of about 0.03 to about 0.12, or in a range of about 0.04 to about 0.12. In some embodiment, the optical film (540) has a sag to radius ratio in any of these ranges after being formed into a curved shape. In some embodiments, the substantially flat optical film (540) is at least uniaxially stretch-oriented. In some embodiments, the substantially flat optical film (540) has an average thickness in a range from about 20 micrometers to about 100 micrometers.

In some embodiments, the optical film (540) is a reflective polarizer (225). In some embodiments, the reflective polarizer (225) substantially reflects normally incident visible light, reflecting at least 50% of the incident light having a first polarization state and transmitting at least 50% of the incident light having an orthogonal second polarization state. In some embodiments, the reflective polarizer (225) has a maximum optical transmittance greater than about 60% for a first polarization state and a maximum optical reflectance greater than about 60% for an orthogonal second polarization state. In some embodiments, the reflective polarizer (225) has a maximum optical transmittance greater than about 70% for a first polarization state and a maximum optical reflectance greater than about 70% for an orthogonal second polarization state. In some embodiments, the reflective polarizer (225) has a maximum optical transmittance greater than about 80% for a first polarization state and a maximum optical reflectance greater than about 80% for an orthogonal second polarization state. In some embodiments, the reflective polarizer (225) has a maximum optical transmittance greater than about 90% for a first polarization state and a maximum optical reflectance greater than about 90% for an orthogonal second polarization state. In some embodiments, the reflective polarizer (225), prior to being formed in the process depicted in FIGS. 5A-5D, is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.) and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Except where specified differently, refractive index refers to the refractive index at a wavelength of 550 nm.

In some embodiments, the optical film (540) is stretched along a first axis (e.g., axis along the x- or y-direction of FIG. 5B). In some embodiments, the flowable material (545) flows into the mold cavity (520) through a gate (525) (FIG. 5B) connected to the mold cavity (520). In some embodiments, the flowable material (545) flows into the mold cavity (520) along the first axis (e.g., axis along the x-direction) or substantially along the first axis. In some embodiments, the flowable material (545) flows into the mold cavity (520) along a second direction (the x direction in the embodiment illustrated in FIG. 5C) that is substantially perpendicular to the first axis (e.g., axis along the y-direction). Substantially along a specified direction can be understood to mean along a direction that is within 40 degrees of the specified direction, and substantially perpendicular can be understood to mean within 40 degrees of perpendicular. In some embodiments, a direction described as substantially along a first axis is with 30 degrees, or with 20 degrees of the first axis. In some embodiments, a direction described as substantially perpendicular to a first axis is within 30 degrees, or with 20 degrees of perpendicular to the first axis.

In some embodiments, a reflective polarizer (225) is formed on an optical lens using the processes described herein to form an optical assembly that is used in an optical system of the present description. In some embodiments, the optical assembly provides a reduced spatial variation in one or more of the maximum transmittance, the band edge wavelength, the pass axis orientation, and the thickness of the reflective polarizer (225) compared to optical assemblies made using conventional methods of forming a film into a curved shape.

Referring again to FIGS. 5A-5D, optical film (540) has a first major surface facing the first mold surface (515) of the first mold (510) and an opposing second major surface facing the second mold surface (535) of the second mold (530). In some embodiments, the first mold surface (515) has a first average surface roughness, and the first major surface of the optical film (540) in the resulting optical assembly has a second average surface roughness. In some embodiments, the second average surface roughness is greater than the first average surface roughness. In some embodiments, the first average surface roughness is about 0.05 micrometers and the second average surface roughness is about 0.1 micrometers. In some embodiments, the optical film (540) prior to forming is a substantially flat reflective polarizer having an average optical transmittance greater than about 70% for a first polarization state and an average optical reflectance greater than about 70% for an orthogonal second polarization state. In some embodiments, after forming, the reflective polarizer is bonded to a solid optical element and the first major surface of the reflective polarizer has a second average surface greater than the first average surface roughness.

Figure 6:
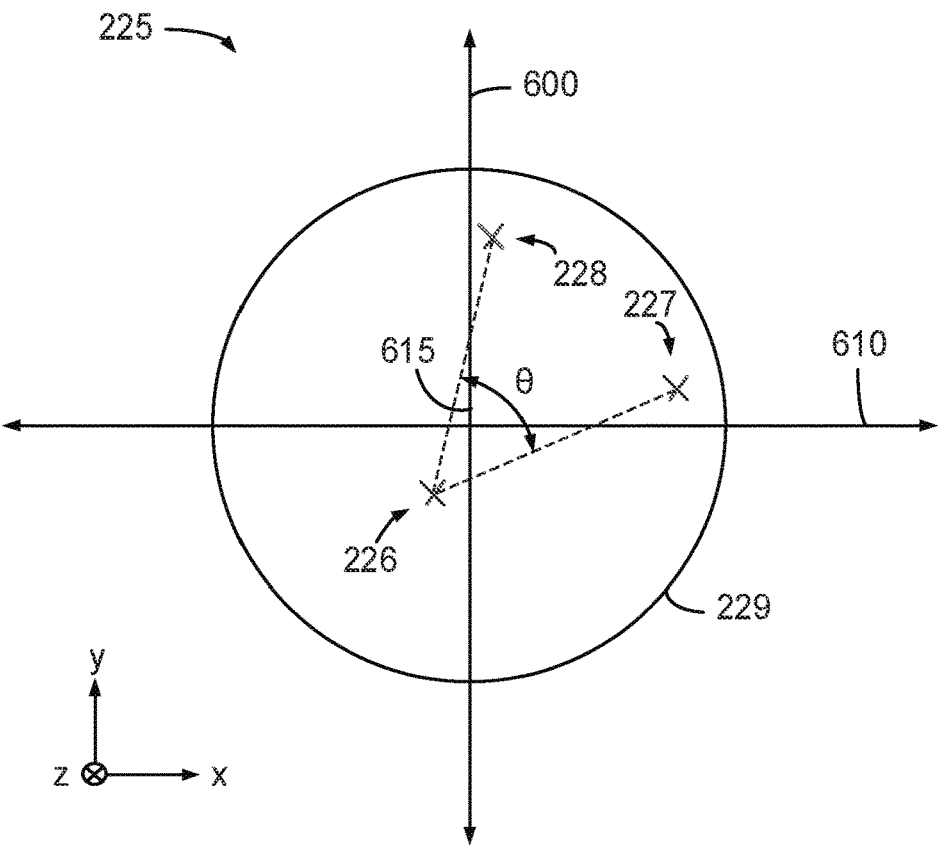
FIG. 6 is a schematic front view of a reflective polarizer.

FIG. 6 is a schematic front view of a reflective polarizer (225). The transmittance variation and/or the band edge wavelength variation may be described by referring to at least one first, second and third locations of the reflective polarizer (225) where the at least one first location is near a center (615) of the reflective polarizer (225), the at least one second and third locations are near an edge (229) of the reflective polarizer (225), and the at least one second location and the at least one third location subtending an angle in a range from about 30 degrees to about 110 degrees at the at least one first location. A location may be described as near a center or edge if it is within about 30 percent of a largest lateral dimension of the reflective polarizer (225) from the center or edge, respectively. A location described as near a center or edge may be within about 25 percent, or about 20 percent, of a largest lateral dimension of the reflective polarizer (225) from the center or edge, respectively.

First location (226), second location (227) and third location (228) are shown in FIG. 6. The second and third locations (227) and (228) subtend an angle θ at the first location (226). In some embodiments, the angle θ is in a range from about 30 degrees to about 110 degrees, or in a range of about 40 to about 100 degrees. In the illustrated embodiment, second location (227) is closer to axis (610), which may be a block axis (610) of the reflective polarizer (225), for example, and third location (228) is closer to orthogonal axis (600), which may be a pass axis of the reflective polarizer (225), for example. In some embodiments, the block axis (610) may have a block polarization state and the orthogonal axis (600) may have an orthogonal pass polarization state. In some embodiment, each location on the reflective polarizer (225) may have a maximum reflectance greater than about 70% for the block polarization state and a maximum transmittance greater than about 70% for the orthogonal pass polarization state, a maximum variation of an orientation of the pass polarization state across the reflective polarizer (225) being about θ1 degrees In some embodiments, for normally incident light having a wavelength in the predetermined wavelength range, each location on the reflective polarizer (225) having a maximum reflectance greater than about 70% for a first polarization state, a maximum transmittance greater than about 70% for an orthogonal second polarization state, and a minimum transmittance for the first polarization state, such that the maximum transmittances of at least one first (e.g., first location (226)), second (e.g., second location (227)) and third (e.g., third location (228)) locations, the at least one first location near a center (615) of the reflective polarizer (225) and the at least one second and third locations near an edge (229) of the reflective polarizer (225), are within about 1%, or within about 0.5% of each other, the at least one second location and the at least one third location subtending an angle (e.g., the angle θ) in a range from about 30 degrees to about 110 degrees at the at least one first location.

Multilayer polymeric reflective polarizer films formed using the processes described elsewhere herein onto a surface of a lens (20) described by Formula 1 with k about 4.9, c about $1/120$ mm$^{-1}$, D about zero, E about 2.5E-06 mm$^{-3}$, and F and higher order terms about zero were found to have a linear diattenuation having a standard deviation of less than about 0.5%. Linear diattenuation is given by $(T_{Max}-T_{Min})/(T_{Max}+T_{Min})$ where $T_{Max}$ is the transmittance of light linearly polarized along a direction which maximizes transmittance and $T_{Min}$ is the transmittance of light linearly polarized along a direction which minimizes transmittance. Another parameter that may be used to characterize an optical assembly including a reflective polarizer disposed on an optical lens, for example, is the circular diattenuation which is given by $(T_R-T_L)/(T_R+T_L)$ where $T_R$ is the transmittance of right circularly polarized light and $T_L$ is the transmittance of left circularly polarized light. Linear diattenuation and circular diattenuation of a reflective polarizer or an optical assembly including a lens and a reflective polarizer can be measured using a polarimeter in transmission mode. A suitable polarimeter is the AxoScan™ Mueller Matrix Polarimeter available from Axometrics, Inc. (Huntsville, AL). The polarimeter can include a polarizer and an analyzer. The polarimeter may be a dual rotating retarder polarimeter.

In some embodiments, for normally incident light, each location on the reflective polarizer (225) having a corresponding reflection band having a band edge wavelength, such that the band edge wavelengths of at least one first (e.g., first location (226)), second (e.g., second location (227)) and third (e.g., third location (228)) locations, the at least one first location near a center (615) of the reflective polarizer (225) and the at least one second and third locations near an edge (229) of the reflective polarizer (225), are within 3%, or within 2%, or within 1% of each other, the at least one second location and the at least one third location subtending an angle (e.g., the angle θ) in a range from about 30 degrees to about 110 degrees at the at least one first location.

The band edge wavelength is expected to vary with the thickness variation of the film. A multilayer polymeric reflective polarizer formed using the processes described elsewhere herein onto a surface of a lens (20) described by Formula 1 with k about 4.9, c about $1/120$ mm$^{-1}$, D about zero, E about 2.5E-06 mm$^{-3}$, and F and higher order terms about zero was found to have a thickness at first second and third locations within about 1% of each other. In one example, a reflective polarizer had a thickness of 65.7 micrometers at the apex of the lens and a thickness of about 66.1 micrometers at a location near the edge of the lens and a thickness of about 65.8 micrometers at another location near the edge of the lens. The minimum thickness was 64.8 micrometers and the maximum thickness was 66.1 micrometers.

Figure 7:
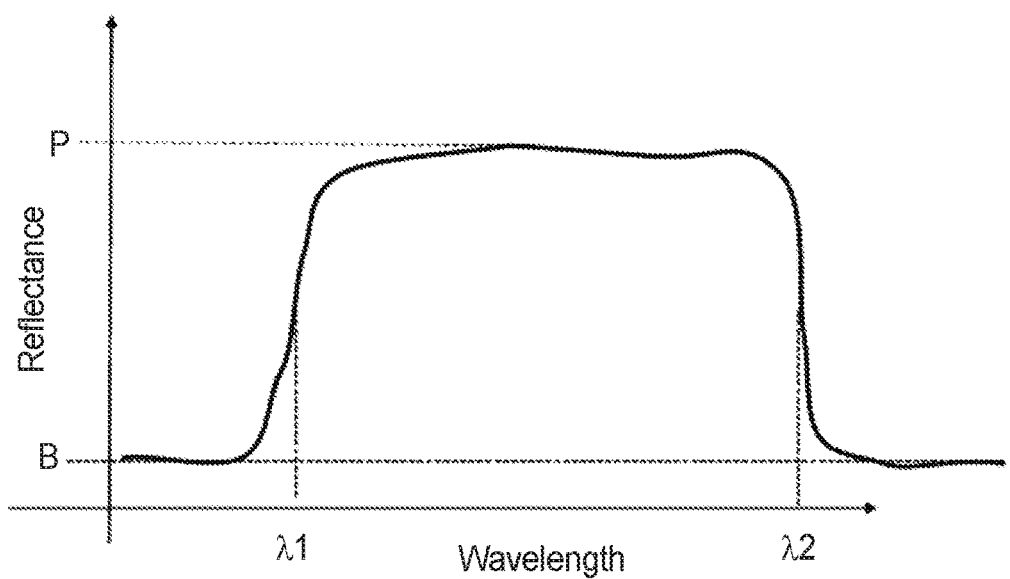
FIG. 7 is a schematic plot of a reflection band.

FIG. 7 schematically illustrates a reflection band having band edge wavelength λ1 and λ2. As described in US 2015/0146166 (Weber et al.), each band edge wavelength can be identified as the wavelength where the reflectivity drops to a value halfway between a maximum reflectance (P) in the reflection band and a baseline reflectance (B) outside of the reflection band. In the illustrated embodiment, the reflectance at the wavelength λ1 and the reflectance at the wavelength λ2 is (B+P)/2. When comparing band edge wavelengths at different locations, it the same band edge (lower or upper wavelength band edge λ1 or λ2) that should be compared at the different locations.

Figure 8A:
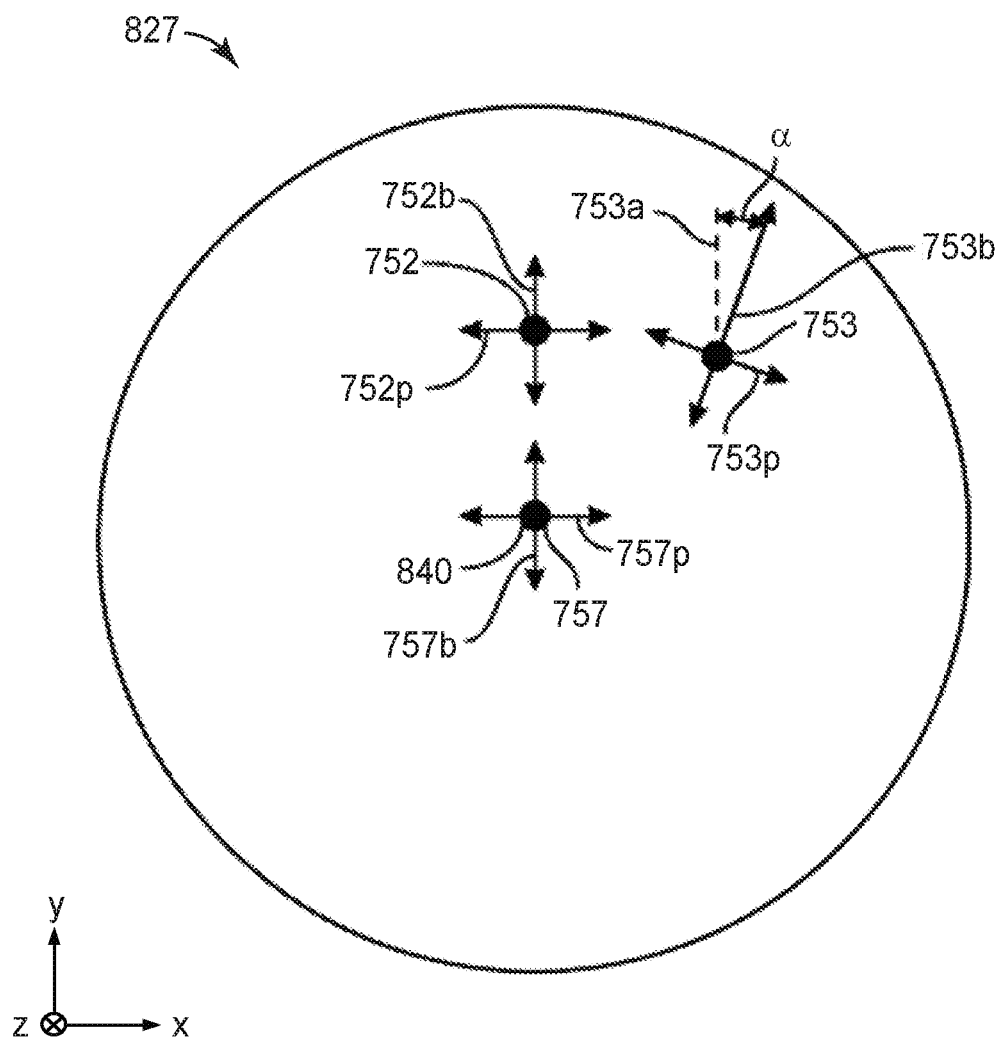
FIGS. 8A-8B are schematic front views of a reflective polarizer.
Figure 8B:
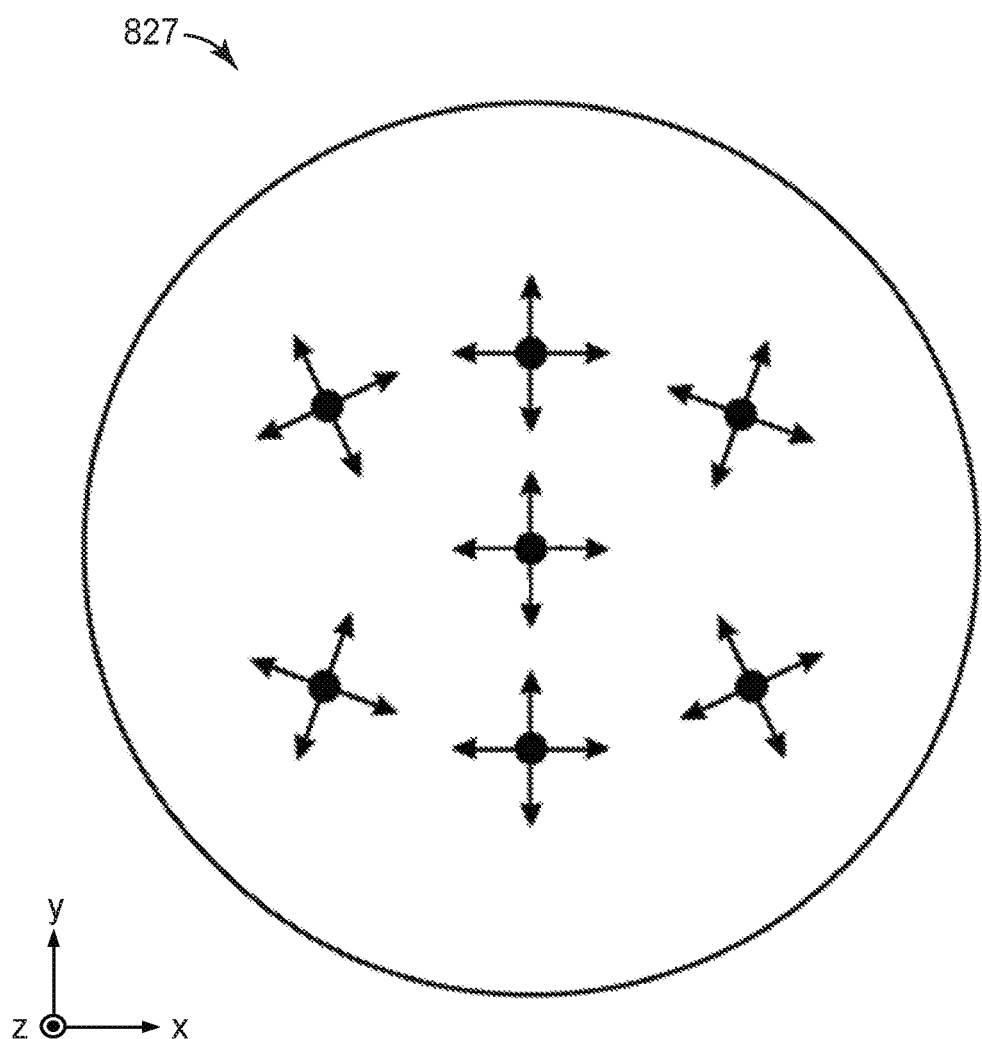
Figure 8C:
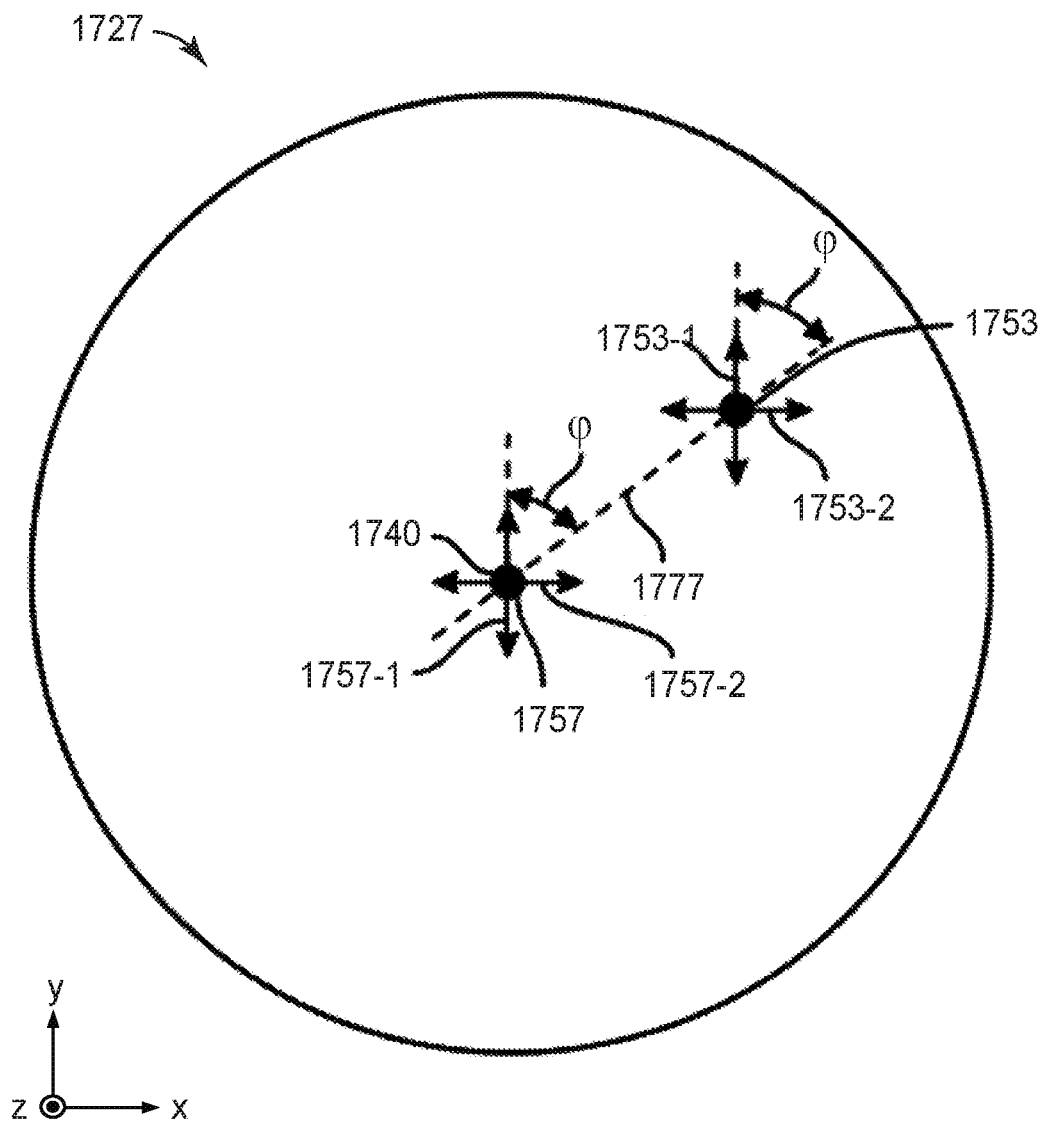
FIG. 8C is a schematic front view of a curved surface.

FIG. 8A is a schematic front view of reflective polarizer (827) having an origin or apex (757) along an optical axis (840). The reflective polarizer (827) is curved about two orthogonal axes (e.g., the x- and y-axes). FIG. 8B is a schematic front view of the reflective polarizer (827) schematically illustrating a possible spatial variation in the orientation of the pass and block axes. The reflective polarizer (827) has orthogonal pass and block axes (757p) and (757b) at the apex (757). The reflective polarizer (827) has orthogonal pass and block axes (752p) and (752b) at a first location (752), and orthogonal pass and block axes (753p)

and (753b) at a second location (753). In the illustrated embodiment, the pass and block axes (752p) and (752b) are substantially aligned with the pass and block axes (757p) and (757b), while the pass and block axes (753p) and (753b) are rotated by an angle α relative to axes aligned with the pass and block axes (757p) and (757b). Axes tangent to a curved surface at different locations on the curved surface may be said to be aligned with each other if a corresponding angle between the axes and a tangent to a shortest smooth curve on the curved surface between the two locations are the same. This is schematically illustrated in FIG. 8C which is a front plan view of a curved surface (1727) illustrating first and second axes (1757-1) and (1757-2) at a first location (1757) and first and second axes (1753-1) and (1753-2) at a second location (1753). The first and second axes (1757-1) and (1757-2) are tangent to the surface (1727) at the first location (1757) and the first and second axes (1753-1) and (1753-2) are tangent to the surface (1727) at the second location (1753). Since the surface (1727) is curved, the first and second axes (1753-1) and (1753-2) are generally in a different plane than the first and second axes (1757-1) and (1757-2). A shortest curve (1777) is shown between the first and second locations (1757) and (1753). The shortest curve (1777) is illustrated as being linear in pan view, but in other cases the curve (1777) may be nonlinear in pan view. An angle φ is shown between the first axis (1757-1) and the curve (1777) at the first location (1757). The corresponding angle between the first axis (1753-1) and the curve (1777) is also φ so that the first axis (1757-1) and the first axis (1753-1) are aligned. Similarly, an angle between the second axis (1757-2) and the curve (1777) at the first location (1757) is equal to the corresponding angle between the second axis (1753-2) and the curve (1777) at the second location (1753) (90 degrees minus φ) so the second axis (1757-2) and the second axis (1753-2) are aligned. The first location (1757) is at an origin (1740) of the curved surface which may be a centroid of the surface and/or an apex and/or a location intersected by an optical axis of an optical system including the curved surface (1727). Axes aligned with the first and second axes (1757-1) and (1757-2) can be defined at each point on the surface (1727) by orienting the axes such that they make the same corresponding angle with respect to a shortest curve between the point and the first location as the first and second axes (1757-1) and (1757-2). The local pass and block axes at each point on a reflective polarizer (827) may be specified relative to axes tangent to the reflective polarizer (827) that are aligned with axes defined at the optical axis (e.g., axes (757b) and/or (757p)). For example, axis (753a) at location (753) is aligned with block axis (757b) since axis (753a) and (757b) are both tangent to the reflective polarizer (827) and have a same angle with respect to a shortest curve between the locations (757) and (753).

In some embodiments, prior to forming a reflective polarizer into a curved shape, the reflective polarizer has a maximum variation of an orientation of the pass polarization state of about θ1 and after forming has a maximum variation of an orientation of the pass polarization state of about θ2. For example, in the embodiment illustrated in FIG. 8A, the orientation of the pass polarization state is rotated by an angle α relative to axes aligned with the pass and block axes (757p) and (757b). In this case, the maximum minus the minimum of the angle α over the reflective polarizer is θ1 prior to forming and is θ2 after forming. In some embodiments, θ1 and θ2 are within about 5 degrees, or within about 4 degrees, or within about 3 degrees, or within about 2 degrees, or within about 1 degree of each other. In some embodiments, θ1 is no more than about 0.5 degrees or no more than about 0.3 degrees, and θ2 is no more than about 1 degree, or no more than about 0.8 degrees, or no more than about 0.6 degrees. In some embodiments, θ1 is about 0.5 degrees and θ2 is about 1 degree. In some embodiments, θ1 is about 0.3 degrees and θ2 is about 0.5 degrees. In some embodiments, θ1 is between about 0.2 degrees and about 0.3 degrees, and θ2 is between about 0.4 degrees and about 1 degree. For example, multilayer polymeric reflective polarizer films formed using the processes described elsewhere herein onto a surface of a lens (20) described by Formula 1 with k about 4.9, c about 1/120 mm$^{-1}$, D about zero, E about 2.5E-06 mm$^{-3}$, and F and higher order terms about zero were found to have a θ2 between about 0.4 degrees and about 1 degree, when the films prior to forming had a θ1 between about 0.2 degrees and about 0.3 degrees.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical system for displaying an image to a viewer comprising:
    a first optical lens having an optical isotropy, having a thickness range from about 1 mm to 7 mm, having a curved first major surface and a curved second major surface having a best-fit spherical first radius of curvature in a range from about 20 mm to about 200 mm, the curved first major surface is closer to a display configured to emit light;
    a second optical lens opposing the first optical lens, having a thickness range from about 0.5 mm to 6 mm, having a third major surface and a fourth major surface having a best-fit spherical second radius of curvature greater than about 500 mm, the fourth major surface is closer to the viewer, the first optical lens concave towards the second optical lens, wherein the first optical lens is separated from the second optical lens by air;
    a partial reflector disposed on and conforming to one of the curved first major surface and the curved second major surface of the first optical lens and having an average optical reflectance of at least 30% in a predetermined wavelength range extending from about 400 nm to about 700 nm;
    a reflective polarizer disposed on and conforming to one of the third major surface and the fourth major surface of the second optical lens, the reflective polarizer substantially reflecting light having a first polarization state and substantially transmitting light having an orthogonal second polarization state in the predetermined wavelength range; and
    a first retarder layer disposed between the display and the first optical lens and a second retarder layer disposed between the first and second optical lenses.

2. The optical system of claim 1, wherein the curved first major surface and the curved second major surface of the first optical lens has a best-fit spherical first radius of curvature in a range from about 20 mm to about 150 mm.

3. The optical system of claim 1, wherein the curved first major surface and the curved second major surface of the first optical lens are described by a formula:

$$z = \frac{cr^2}{1 + [1 - (1+k)c^2r^2]^{1/2}} + Dr^2 + Er^4 + Fr^6 + Gr^8 + Hr^{10} + Ir^{12} + Jr^{14}$$

where r is a distance from an optical axis of the optical system to the aspherical surface, c is a curvature coefficient, k is a conic constant and D, E, F, G, H, I and J are correction coefficients of the aspherical surface.

4. The optical system of claim 1, wherein the third major surface and the fourth major surface of the second optical lens has a best-fit spherical second radius of curvature greater than about 750 mm.

5. The optical system of claim 1, wherein the second optical lens has an optical birefringence and the reflective polarizer is disposed between the second optical lens and the first optical lens, wherein the optical birefringence is greater than about 15 nm/cm.

6. The optical system of claim 1 having an optical axis, a light ray propagating along the optical axis passing through the first and second optical lenses, the partial reflector, the reflective polarizer, and the first and the second retarder layers without being substantially refracted, such that for a cone of light incident on the optical system from an object comprising a spatial frequency of about 11 line pairs per millimeter filling an exit pupil with a chief ray of the cone of light passing through a center of opening of the exit pupil and a projection of the chief ray on a plane formed by the optical axis and the second polarization state making an angle of about 0 degrees with the optical axis and a projection of the chief ray on a plane formed by the optical axis and the first polarization state making an angle of about 25 degrees with the optical axis, the optical system has a modulation transfer function (MTF) greater than about 0.5.

7. The optical system of any one of claim 1 having an optical axis, a light ray propagating along the optical axis passing through the first and second optical lenses, the partial reflector, the reflective polarizer, and the first and the second retarder layers without being substantially refracted, such that for a cone of light incident on the optical system from an object comprising a spatial frequency of about 3 line pairs per millimeter filling an exit pupil with a chief ray of the cone of light passing through a center of the opening of the exit pupil and a projection of the chief ray on a plane formed by the optical axis and the second polarization state making an angle of about 15 degrees with the optical axis and a projection of the chief ray on a plane formed by the optical axis and the first polarization state of about 10 degrees with the optical axis, the optical system has a modulation transfer function (MTF) greater than about 0.7.

8. The optical system of any one of claim 1 having an optical axis, a light ray propagating along the optical axis passing through the first and second optical lenses, the partial reflector, the reflective polarizer, the first and the second retarder layers without being substantially refracted, a cone of light incident on the optical system from an object comprising a spatial frequency of about 20 line pairs per millimeter filling an exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

9. An optical system for displaying an image as a virtual image to a viewer, comprising:
   a hollow lens comprising curved first and second major surfaces, and opposing flat third and fourth major surfaces, the curved major surfaces and the flat major surfaces separated by air;
   a partial reflector curved substantially as the curved first and second major surface, disposed between the curved first major surface and a display, and reflecting at least 30% of visible light;
   a flat reflective polarizer disposed between the curved second major surface and the viewer, for substantially reflecting normally incident visible light, the reflective polarizer reflecting at least 50% of the incident light having a first polarization state and transmitting at least 50% of the incident light having an orthogonal second polarization state; and
   a first retarder layer disposed between the curved first major surface and the display and a second retarder layer disposed between the curved second major surface and the flat reflective polarizer and being substantially a quarter wave retarder for at least one visible wavelength, the optical system substantially centered on an optical axis, such that for an image emitted by the display having a spatial frequency of about 11 line pairs per millimetre and a light ray from the image to the virtual image with a projection of the light ray on a plane formed by the optical axis and the second polarization state making an angle of about 0 degrees with the optical axis and a projection of the light ray on a plane formed by the optical axis and the first polarization state making an angle of about 25 degrees with the optical axis, the virtual image of the emitted image formed by the optical system has a modulation transfer function (MTF) greater than about 0.5, wherein the reflective polarizer having a maximum reflectance greater than about 60% for the first polarization state and a maximum transmittance greater than about 60% for the second polarization state.

10. A method of fabricating an optical assembly, comprising:
   providing a first mold comprising a curved first mold surface having a best-fit spherical first radius of curvature in a range from about 20 mm to about 200 mm;
   providing a substantially flat reflective polarizer, each location on the reflective polarizer having a maximum reflectance greater than about 70% for a block polarization state and a maximum transmittance greater than about 70% for an orthogonal pass polarization state, a maximum variation of an orientation of the pass polarization state across the reflective polarizer being about θ1 degrees;
   placing the substantially flat reflective polarizer on the curved first mold surface and applying at least one of pressure and heat to at least partially conform the substantially flat reflective polarizer to the curved first mold surface;
   providing a second mold comprising a second mold surface spaced apart from and aligned with the first mold surface, the first and second mold surfaces defining a mold cavity therebetween;
   substantially filling the mold cavity with a flowable material having a temperature greater than a glass transition temperature of the reflective polarizer; and solidifying the flowable material to form a solid optical element bonded to the reflective polarizer, a maximum variation of an orientation of the pass polarization state across the bonded reflective polarizer being about θ2 degrees, θ1 and θ2 being within about 3 degrees of each other.

* * * * *